United States Patent [19]

Hyde et al.

[11] Patent Number: 4,924,719
[45] Date of Patent: May 15, 1990

[54] MECHANICAL LINKAGE CHARACTERIZER

[76] Inventors: Michael L. Hyde, 4352 E. Holtwood Ave., Anaheim Hills, Calif. 92807; Donald F. Cart, 2009 S. Pacific Ave., Santa Ana, Calif. 92704

[21] Appl. No.: 460,624

[22] Filed: Jan. 24, 1983

[51] Int. Cl.⁵ ...................... F16H 21/44; F16H 53/06
[52] U.S. Cl. ...................... 74/99 A; 74/107; 74/568 R; 74/569
[58] Field of Search ................. 74/96, 110, 99 A, 107, 74/99 R, 471 R, 567, 568, 569; 431/76, 74

[56] References Cited

U.S. PATENT DOCUMENTS

| | | | |
|---|---|---|---|
| 2,341,177 | 2/1944 | Cope | 74/568 |
| 2,777,513 | 6/1957 | Cooper | 74/568 |
| 2,808,506 | 10/1957 | Skwarek | 74/471 |
| 2,959,967 | 11/1960 | Metzner | 74/569 |
| 2,964,112 | 12/1960 | Gunberg | 74/471 |
| 3,096,020 | 7/1963 | Kraft | 74/568 |
| 3,204,208 | 8/1965 | Lyman et al. | 74/110 |
| 3,330,477 | 7/1967 | Stephens | 74/479 |
| 3,433,091 | 3/1969 | Jullien-Davin | 74/568 |
| 3,504,556 | 4/1970 | Mills | 74/96 |
| 3,654,817 | 4/1972 | Kane | 74/568 R |
| 3,685,364 | 8/1972 | Turecek et al. | 74/569 |
| 3,756,089 | 9/1973 | Haladay | 74/96 |

FOREIGN PATENT DOCUMENTS

| | | | |
|---|---|---|---|
| 55978 | 10/1912 | Austria | 74/568 |
| 2827771 | 1/1980 | Fed. Rep. of Germany | 431/76 |
| 759772 | 10/1956 | United Kingdom | 74/568 |

Primary Examiner—Allan D. Herrmann
Attorney, Agent, or Firm—Bright & Lorig

[57] ABSTRACT

A mechanical linkage characterizer for varying the movement of one output linkage with respect to an input from a linkage includes a generally box-like housing with a carriage mounted on tracks within the housing with a pivotally mounted output arm carried on the movable carriage and a pair of elongated variable contour stationary cams positioned adjacent the track for pivotally moving the output arm in response to movement of the carriage along the tracks.

6 Claims, 2 Drawing Sheets

MECHANICAL LINKAGE CHARACTERIZER

BACKGROUND OF THE INVENTION

The present invention relates to control linkages and pertains particularly to a mechanical linkage characterizer for selectively altering the output characteristics of a linkage.

Many actuating systems employ mechanical linkages to control the positioning of two or more elements or devices having a desired relationship to one another. A typical example is the controlling of the fuel and combustion air to furnaces, boilers and the like. The typical fossil fuel fired boilers and furnaces employ a control system utilizing a thermostatically responsive actuator controlling the positioning of the fuel supply valve and the air intake damper to the combustion chamber. Such a control device may vary the fuel valve and the associated air damper over a given range for providing the level of desired heat generation.

The mechanical linkage systems used, however, do not always provide the optimum ratio of fuel-to-air for efficient combustion.

With the dramatic increase in the cost of fuel in recent years, the efficiency of boilers, furnaces and the like have become critical. Whereas it is possible with most linkage systems to provide optimum efficiency at one or more settings, it is not possible to provide optimum efficiency over the full range of the control settings.

It is therefore desirable that a simple and inexpensive, mechanical linkage characterizer be available for providing optimum efficiency over the full range of the control settings.

SUMMARY AND OBJECTS OF THE INVENTION

It is therefore the primary object of the present invention to provide an improved mechanical linkage characterizer for linkage control systems.

In accordance with the primary aspect of the present invention, a mechanical linkage characterizer for converting linear motion to a complex linear motion includes a housing having means defining a linear track with a carriage reciprocably mounted on the track and an output linkage arm mounted for oscillation on the carriage with cam means disposed adjacent to carriage for imposing a selected motion on the arm upon movement of the carriage along the track.

BRIEF DESCRIPTION OF THE DRAWINGS

The above and other objects and advantages of the present invention will become apparent from the following description when read in conjunction with the drawings wherein.

DETAILED DESCRIPTION OF THE PREFERRED EMBODIMENT

Figure 1:
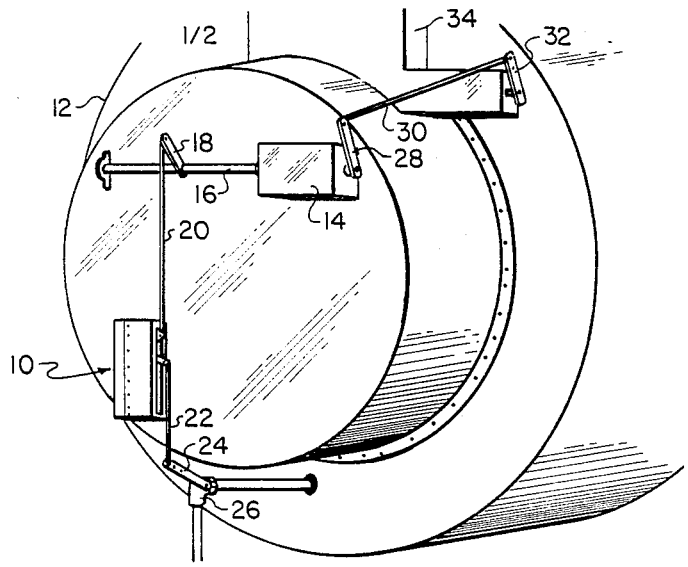
FIG. 1 is a perspective view of an installation showing the invention in use.

Turning to the drawings and referring specifically to FIG. 1, a mechanical linkage characterizer designated generally by the numeral 10 is shown installed in a control system for a typical installation of a heat generating plant such as a furnace or boiler 12. The illustrated installation includes a control motor 14 connected by a control linkage including a rotatable shaft 16 and arm 18 and linkages 20, 22 and lever arm 24 for controlling a gas or oil valve 26 for controlling supply of fuel to the burner of the heat generating unit 12. The control system is also connected by a lever 28 attached to shaft 16 and linkage 30 to a damper control arm 32 for controlling the combustion air supply through an air intake duct or the like 34. The characterizer unit 10, as will be subsequently explained, may be adjusted such that the movement of the control lever for the fuel valve 26 is compensated such that it is characterized or coordinated with the damper control such that for each advance of the fuel valve, the proper opening of the air damper 34 results in a proper combustion mixer for the heat generating plant. The characterizer 10 includes an input member to which linkage 20 is attached and an output member to which the linkage 22 is attached such that the output will vary from the input or, more specifically, the motion of the output lever will be imposed upon, in addition to the motion of the input, such that the fuel valve is positioned to the proper setting.

The characterizer may be utilized in any linkage system wherein two or more control members must be coordinated and matched for a proper positioning over a range of movement. This range of movement may be anywhere from 2 inches up to 3 feet or more.

The basic characterizer mechanism includes means to impose an additional movement upon the basic input movement which in the illustrated embodiment constitutes basically a linear movement. This movement is imposed upon the basic movement which we call the input movement to the carriage by means of stationary substantially infinitely adjustable cams disposed adjacent to the carriage track which operate to move an output lever arm on the carriage. The movement of the output leverage arm is along and in the direction of movement of the main carriage, thus the movement is either added to or subtracted to the movement of the carriage.

Figure 3:
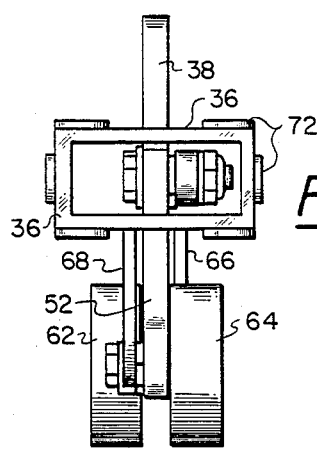
FIG. 3 is an end view of the carriage of FIG. 2.
Figure 2:
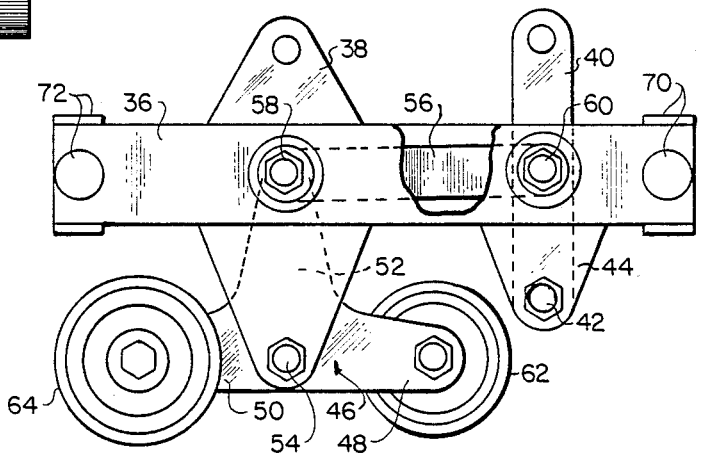
FIG. 2 is a side elevation view of the carriage of the unit of FIG. 1.

Referring to FIGS. 2 and 3 of the drawings, the carriage is illustrated and comprises a generally rectangular box-like body member 36 having an input control tab 38 connected or mounted directly thereon such as by welding or the like for which an input control linkage member such as a link 20 is connected for movement of the carriage member. The carriage further includes an output arm 40 to which is connected an output linkage member such as link member 22. The output linkage or arm member 40 is pivotally connected at a fulcrum point by pin or bolt 42 which is mounted on a tab or bracket 44 depending downward from the body member 36. A generally T-shaped lever or bell-crank 46 having a pair of opposed outwardly extending arms 48 and 50 and a central arm 52 is mounted for pivoting about a fulcrum pin 54 at approximately the juncture of the arms. This lever is connected at the outer end of the central arm 52 to a link 56 by means of a pin 58 and is connected by a pin or bolt 60 to the output lever 40 at a position intermediate the ends thereof. A pair of rotatable cam follower members 62 and 64 are mounted on the outermost ends of outwardly extending opposed arms 48 and 50 and are positioned on opposite sides thereof for engaging parallel stationary cams for the imposition of a camming action on the lever arm 52 which is transmitted through the linkage 56 to the output arm 40. This oscillating lever or bell-crank is mounted between a pair of tabs 66 and 68 which are secured to and depend downward from the body member 36.

Figure 4:
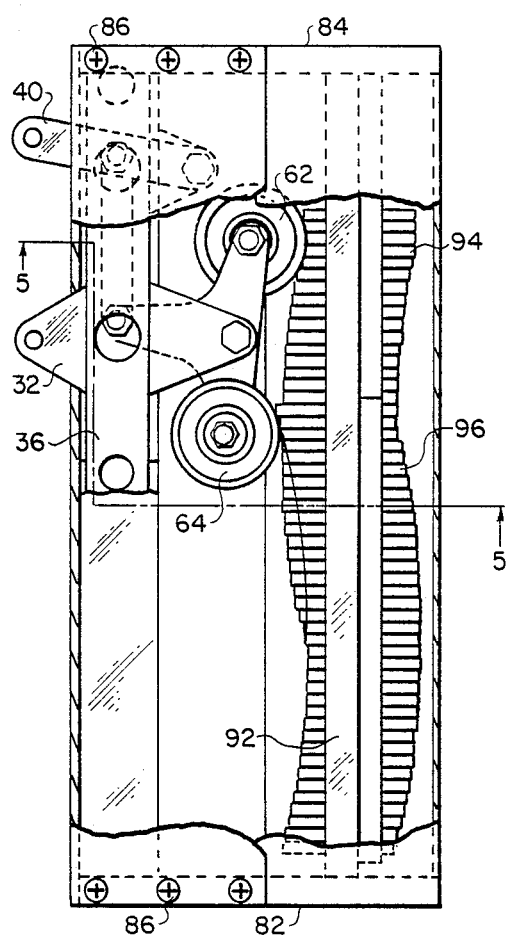
FIG. 4 is a side elevation view with portions broken away to show details of the invention.
Figure 6:
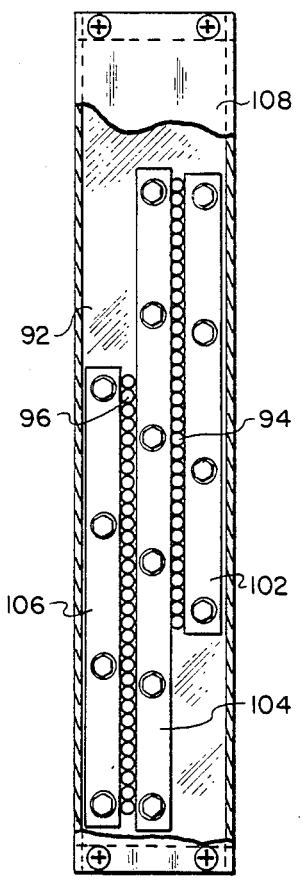
FIG. 6 is a bottom plan view of FIG. 4 showing the adjustable cam.
Figure 5:
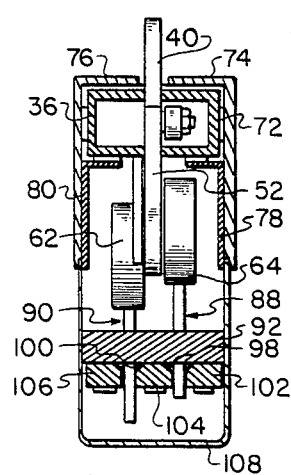
FIG. 5 section taken generally on line 5—5 of FIG. 4.

This carriage member is mounted within a generally box-like housing as shown in FIG. 4 with the followers on the lever 46 engaging a pair of infinitely adjustable stationary cams as will be described. The carriage 36 includes a plurality of bearing members, such as nylon button bearings 70 at the forwardmost end thereof and a similar identical group of bearings 72 at the rear end thereof for engaging a generally channel-like track formed in the housing. The housing as shown in FIGS. 4 and 5 include means in the form of pairs of opposed outer generally L-shaped beams or bars 74 and 76 to which are secured similarly shaped, but slightly smaller, generally L-shaped bars 78 and 80 forming a pair of adjacent opposed channel-like tracks embracing the rectangular body member 36 of the carriage as shown in FIG. 5.

The channel members 74,76 and 78,80 are secured at the ends thereof and between a pair of end plates 82 and 84 by screws or the like 86. This provides the basic support framework and track supporting and mounting the carriage for reciprocal movement the length of the housing as shown in FIG. 4. A pair of adjacent stationary cams designated generally by the numerals 88 and 90 comprise individual closely adjacent cylindrical screws threadably mounted within a plurality of bores formed within a plate member 92 mounted between the end plates 82 and 84. The stationary cams are each constructed of a plurality of individual cylindrical threaded screws 94 and 96 which are threaded into a plurality of bores as previously explained. These screws may be adjustably positioned relative to the base support member 92 to form the curvature of the cams for engagement with the followers 62 and 64. Once the screws are adjusted to provide the appropriate cam configuration, they are clamped in position by means of pairs of gripping strips such as nylon or the like 98 biased by angled corners of clamp bars 102, 104 and 106 secured by a plurality of bolts directly to the support member 92.

In operation, the characterizer in accordance with the invention is positioned within a control linkage system such that an input control linkage is connected to the input linkage tab 38 and an output linkage is connected to the output arm 40. Adjustment in the respective movement is provided by appropriately positioning the output lever 40 for its desired position for each position of the carriage 36 along its track within the housing. At each positioning, the multiple screws 94 and 96 making up the cams 88 and 90, are adjusted to engage the followers 62 and 64. This procedure is repeated along the entire movement of the carriage along its track. This provides a proper contour of the respective cams for obtaining the output motion desired for the respective input motion. Upon completion of the adjustment of the cam, the clamp plates 102, 104 and 106 are clamped down, that's clamping the many screws making up the stationary cams into place. The unit then obtains the appropriate output motion for the desired input.

The double cam provides positive movement of the output arm 40 in both directions of movement. The return direction can be controlled by a return spring, thereby eliminating one of the cams. The dual cam, however, is preferred since it provides positive movement of the output arm in both directions.

A removable cover 108 fits over the bottom of the housing covering cams 88 and 90. Removal of this cover 108 exposes the cams to permit adjustment thereof.

While we have illustrated and described our invention by means of specific embodiments, it is to be understood that numerous changes and modifications may be made therein without departing from the spirit and scope of the invention as defined in the appended claims.

We claim:

1. A mechanical linkage characterizer for converting linear motion to complex linear motion comprising: housing means defining a linear track; a carriage mounted for reciprocating movement along said track; an output arm mounted for oscillation on said carriage; cam means comprising first and second elongated adjustable contour stationary cams extending parallel along said track and operatively connected to said output arm for moving said output arm relative to said carriage upon movement of said carriage along said track; and linkage means operatively connecting said cam means to said output arm, said linkage means comprising a lever pivotally mounted on said carriage, first and second follower means mounted on said lever for engagement respectively with said first and second cams, and a link member connected at opposite ends to said lever and said arm.

2. The characterizer of claim 1 wherein said lever has a generally T-shape defined by a central arm and a pair of outwardly extending opposed arms, said lever is pivotally mounted at the juncture of said arms, said follower means comprises a roller mounted on the outer end of each of said opposed arms, and said link member is connected to the outer end of said central arm.

3. The characterizer of claim 2 wherein said track is defined by opposed pairs of outer and inner beams having a generally L-cross-sectional configuration forming opposed rectangular channels, and said carriage is mounted in said channels.

4. The characterizer of claim 3 wherein said carriage is a generally rectangular box-like body member disposed in said channels.

5. The characterizer of claim 1 wherein said cams each comprise a row of a plurality of adjustable screws mounted in a support member.

6. The characterizer of claim 5 wherein said screws are held in place by clamping means including a gripping strip biased into engagement therewith.

* * * * *